(12) United States Patent
Jasinski et al.

(10) Patent No.: US 10,379,849 B1
(45) Date of Patent: Aug. 13, 2019

(54) METHODS AND APPARATUS FOR VISUALIZATION OF CONTEXTUAL CODE EXECUTION

(71) Applicant: Dell Products L. P., Round Rock, TX (US)

(72) Inventors: Adam Jasinski, Dublin (IE); Carlos Manuel dos Santos Martins Rodrigues, Sallynoggin (IE); Donal Carpenter, Wicklow (IE); Zygimantas Mockus, Dublin (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/886,211

(22) Filed: Feb. 1, 2018

(51) Int. Cl.
*G06F 9/44* (2018.01)
*G06F 8/75* (2018.01)
*G06F 11/36* (2006.01)
*G06F 8/41* (2018.01)

(52) U.S. Cl.
CPC .............. *G06F 8/75* (2013.01); *G06F 8/433* (2013.01); *G06F 11/3604* (2013.01); *G06F 11/3636* (2013.01)

(58) Field of Classification Search
CPC ... G06F 8/65; G06F 8/75; G06F 8/751; G06F 8/77
USPC ............................................ 717/123–133
See application file for complete search history.

(56) References Cited

U.S. PATENT DOCUMENTS

| | | | | |
|---|---|---|---|---|
| 6,035,123 A | * | 3/2000 | Razdan | G06F 8/443 712/E9.035 |
| 6,397,379 B1 | * | 5/2002 | Yates, Jr. | G06F 9/45554 717/140 |
| 6,721,941 B1 | * | 4/2004 | Morshed | G06F 11/3612 709/217 |
| 6,760,903 B1 | * | 7/2004 | Morshed | G06F 11/3466 717/130 |

(Continued)

OTHER PUBLICATIONS

Velicheti et al, "Towards Modeling the Behavior of Static Code Analysis Tools", ACM, pp. 17-20, 2014 (Year: 2014).*

(Continued)

*Primary Examiner* — Anil Khatri
(74) *Attorney, Agent, or Firm* — Ryan, Mason & Lewis, LLP (57) ABSTRACT

Methods, apparatus and computer program products are provided for the visualization of software execution. One method comprises: generating, using a static code analysis, a data flow diagram illustrating a plurality of possible code execution paths of software code; marking, using an execution profiler, a particular execution path through the data flow diagram for a specific execution scenario; and enriching one or more nodes in the data flow diagram marked with the particular execution path for the specific execution scenario with information extracted from one or more application logs. The marked data flow diagram may be enriched, for example, by extracting a particular portion of a log file and tagging a corresponding portion of the data flow diagram with the extracted particular portion of the log file. The extracted log information may comprise, for example, a timestamp, a log category, a software module name, a function name and/or contextual information.

23 Claims, 8 Drawing Sheets

(56) References Cited

U.S. PATENT DOCUMENTS

| | | | |
|---|---|---|---|
| 6,941,545 B1* | 9/2005 | Reese | G06F 9/45554 711/206 |
| 7,013,456 B1* | 3/2006 | Van Dyke | G06F 9/45533 712/208 |
| 7,430,670 B1* | 9/2008 | Horning | G06F 21/14 713/190 |
| 7,975,257 B2* | 7/2011 | Fanning | G06F 11/3616 717/107 |
| 8,291,383 B1* | 10/2012 | Evans | G06F 11/3636 717/124 |
| 8,332,939 B2* | 12/2012 | Centonze | G06F 9/468 726/1 |
| 8,578,348 B2* | 11/2013 | Fliess | G06F 8/70 717/135 |
| 8,621,441 B2* | 12/2013 | Landwehr | G06F 11/3604 714/38.1 |
| 8,806,450 B1* | 8/2014 | Maharana | G06F 11/3688 717/133 |
| 8,990,783 B1* | 3/2015 | Yu | G06F 8/35 703/22 |
| 9,571,666 B2* | 2/2017 | Sharma | G06F 16/24573 |
| 9,785,777 B2* | 10/2017 | Sharma | G06F 21/577 |
| 9,823,912 B2* | 11/2017 | Spoon | G06F 11/3604 |
| 2013/0283246 A1* | 10/2013 | Krajec | G06F 11/3466 717/130 |
| 2016/0092336 A1* | 3/2016 | Atanasiu | G06F 11/323 717/133 |

OTHER PUBLICATIONS

Lochmann et al, "Integrating Quality Models and Static Analysis for Comprehensive Quality Assessment", ACM, pp. 5-11, 2011 (Year: 2011).*

Moser et al, "Exploring Multiple Execution Paths for Malware Analysis", IEEE, pp. 1-15 (Year: 2007).*

Huang et al, "Securing Web Application Code by Static Analysis and Runtime Protection", ACM, 40-51 (Year: 2004).*

Zheng et al, "Path Sensitive Static Analysis of Web Applications for Remote Code Execution Vulnerability Detection", IEEE, pp. 652-661 (Year: 2013).*

Kleinsorge et al, "Simple Analysis of Partial Worst-case Execution Paths on General Control Flow Graphs", IEEE, pp. 1-10 (Year: 2013).*

\* cited by examiner

```
class BatchProcessor
{
    public void ReadFile(File file)
    {
        if(file.Empty) {
            Scheduler.Schedule(this, DateTime.Now.AddHours(1));
        }
        else {
            var lines = file.ReadAllLines();
            for(int i = 0; i < lines.Count; ++i) {
                var line = line[i];
                ProcessLine(line);
                if(i == 5){
                    Console.WriteLine("buzz");
                }
                else {
                    Logger.LogInfo($"Processing line entry
                    {line.EntryNumber}, order id {line.OrderNumber}");
                    SendCommand(line);
                    Console.WriteLine("fizz");
                }
            }
            file.Close();
        }
    }
}
```

METHODS AND APPARATUS FOR VISUALIZATION OF CONTEXTUAL CODE EXECUTION

FIELD

The field relates generally to the visualization of software.

BACKGROUND

Software visualization typically refers to the visualization of software systems, such as the source code of a software system. Existing software visualization tools typically employ a static analysis of the source code to obtain a representation of the structure, execution and/or behavior of the source code. Software visualization tools typically process software traces that record execution behavior to generate the representation of the source code.

The source code representations generated by software visualization tools may be employed, for example, to (i) educate a software engineer assigned to work on a complex software application; and/or (ii) generate and/or update technical documentation of a software application. Different use cases of the same software application, however, can have different code execution paths, increasing the complexity of the data flow diagrams to be maintained.

A need therefore exists for improved techniques for the visualization of the execution of software.

SUMMARY

In some embodiments, methods and apparatus are provided for the visualization of the execution of software. An exemplary method comprises: generating, using a static code analysis, a data flow diagram illustrating a plurality of possible code execution paths of software code; marking, using an execution profiler, a particular execution path through the data flow diagram for a specific execution scenario; and enriching one or more nodes in the data flow diagram marked with the particular execution path for the specific execution scenario with information extracted from one or more application logs.

In some embodiments, the data flow diagram is enriched by extracting a particular portion of a log file and tagging a corresponding portion of the data flow diagram with the extracted particular portion of the log file. The extracted log information may comprise, for example, a timestamp, a log category, a software module name, a function name and/or contextual information.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide techniques for the visualization of the execution of software. Generally, in some embodiments, the disclosed software visualization techniques combine static code analysis with data analysis from an execution profiler and application log analysis to visualize code execution on a data flow diagram.

In one or more embodiments, the disclosed software visualization techniques initially generate a data flow diagram using a static code analysis to illustrate multiple possible code execution paths of software code. Thereafter, a particular execution path through the data flow diagram, as obtained, for example, from an execution profiler, is marked for a specific execution scenario, to generate an execution path diagram. Finally, one or more nodes in the execution path diagram are enriched with contextual information extracted from one or more application logs to generate an enriched execution path diagram. The disclosed software visualization techniques can optionally be repeated for multiple use cases, resulting in multiple enriched execution path diagrams that can be included in technical documentation, for example, to help software developers identify code execution paths for specific scenarios.

Figure 1:
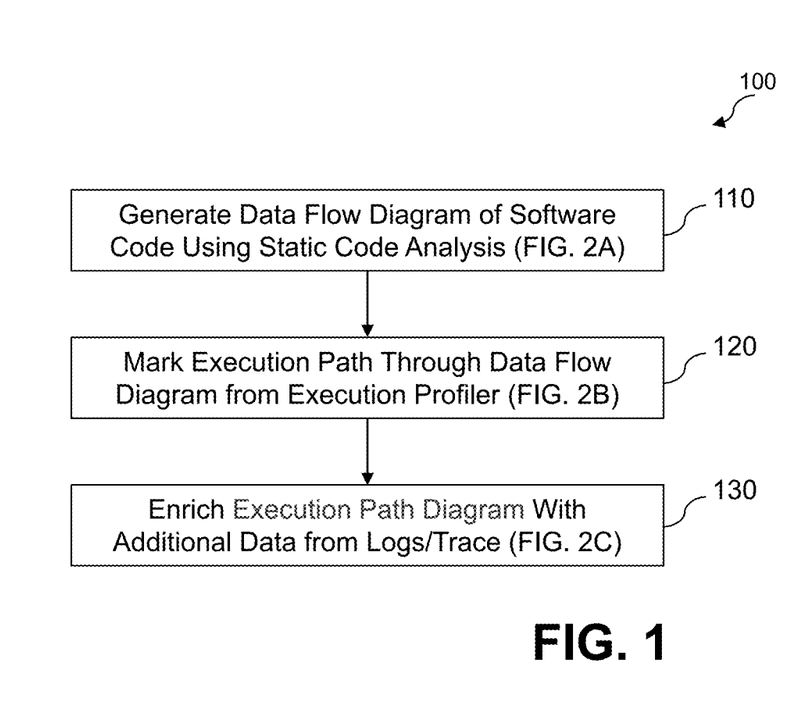
FIG. 1 is a flow chart illustrating an exemplary implementation of a software visualization process, according to one embodiment of the disclosure.

FIG. 1 is a flow chart illustrating an exemplary implementation of a software visualization process 100, according to one embodiment of the disclosure. As shown in FIG. 1, the exemplary software visualization process 100 initially generates a data flow diagram of software code using a static code analysis during step 110, as discussed further below in conjunction with FIG. 2A. Thereafter, the exemplary software visualization process 100 marks an execution path through the data flow diagram from execution profiler during step 120, as discussed further below in conjunction with FIG. 2B. Finally, the execution path diagram is enriched during step 130 with additional data from logs and/or traces, as discussed further below in conjunction with FIG. 2C.

Figure 2A:
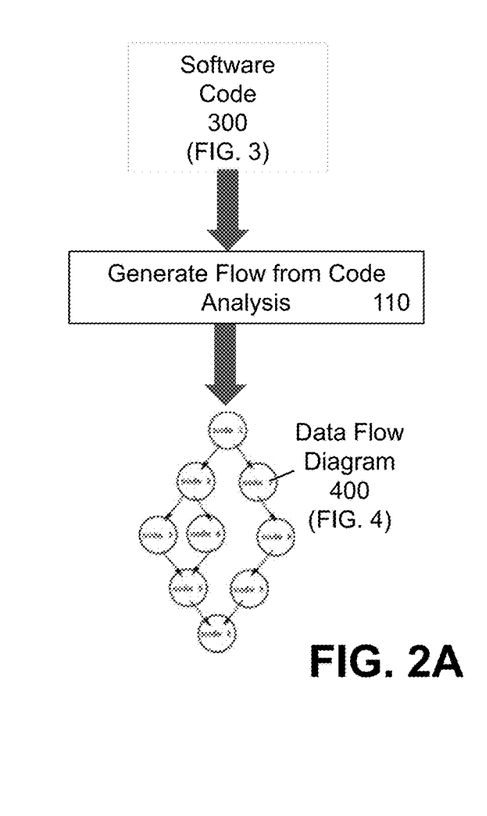
FIGS. 2A through 2C illustrate various steps of the exemplary software visualization process of FIG. 1, in further detail, according to some embodiments.

FIG. 2A illustrates the generation of the data flow diagram by the exemplary software visualization process 100 of FIG. 1, in further detail, according to an embodiment. As shown in FIG. 2A, the data flow diagram is generated during step 110 by processing the software code 300 (as discussed further below in conjunction with FIG. 3) to be visualized.

Generally, in one or more embodiments, static code analysis is used during step 110 to analyze run-time behavior of the software code 300 and to create a data flow diagram 400 (a representative data flow diagram 400 is discussed further below in conjunction with FIG. 4) comprising a flow chart of substantially all possible executions of the software code 300.

Figure 2B:
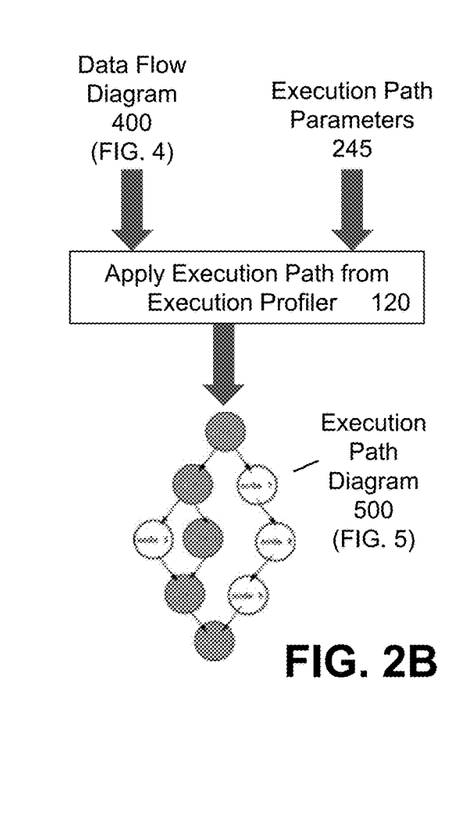

FIG. 2B illustrates the marking of a particular execution path through the data flow diagram by the exemplary software visualization process 100 of FIG. 1, in further detail, according to some embodiments. As shown in FIG. 2B, the data flow diagram 400 (FIG. 4) generated during step 110 is processed during step 120 together with one or more execution path parameters 245 obtained, for example, from an execution profiler. In some embodiments, data obtained from a Call Stack is used to mark code execution paths through the data flow diagram 400 that were executed for a particular execution (associated with, for example, a particular use case and/or application scenario). As shown in FIG. 2B, step 120 of the exemplary software visualization process 100 generates an execution path diagram 500, as discussed further below in conjunction with FIG. 5.

Figure 2C:
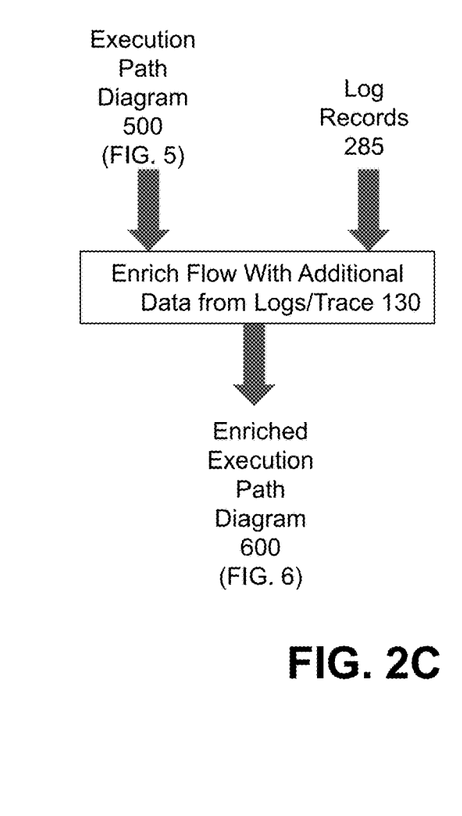

FIG. 2C illustrates the enrichment of the execution path diagram by the exemplary software visualization process 100 of FIG. 1, in further detail, according to one embodiment. As shown in FIG. 2C, the execution path diagram 500 (FIG. 5) generated during step 120 is processed during step 130, along with a plurality of log records 285. Generally, step 130 enriches one or more nodes in the execution path diagram 500, representing functions in the software code 300, with log data from log records 285, such as application logs and execution timestamps, to provide an enriched execution path diagram 600 with more contextual information, as discussed further below in conjunction with FIG. 6. The enriched execution path diagram 600 can help illustrate the exact code flow for a specific use case.

As discussed further below, the enrichment step 130 may comprise, for example, searching one or more application logs for timestamps, software module names, function names, and/or additional identifiers or contextual information, such as software thread identifiers, that correlate with the particular execution path for a specific execution scenario.

Figure 3:
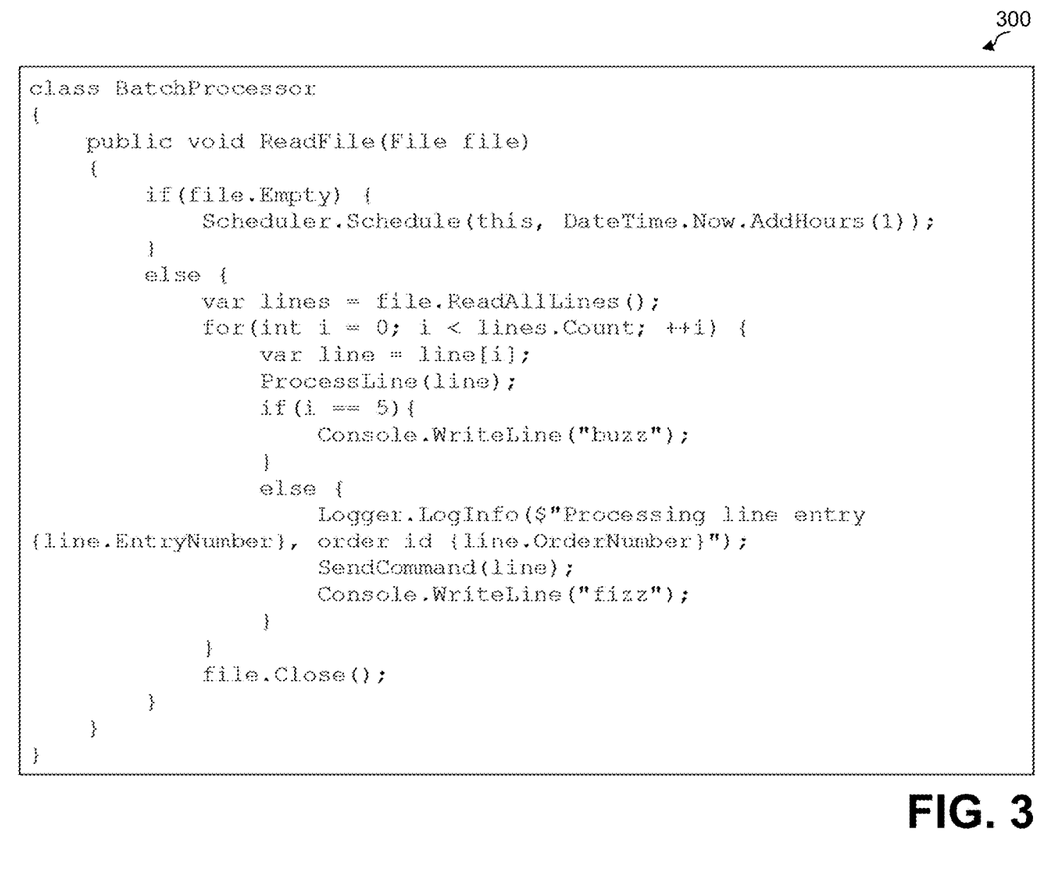
FIG. 3 illustrates a code fragment of exemplary software code that may be visualized using the disclosed software visualization techniques, according to one or more embodiments.

FIG. 3 illustrates a code fragment 300 of exemplary software code that may be visualized using the disclosed visualization techniques, according to one or more embodiments. An exemplary data flow diagram 400, as discussed further below in conjunction with FIG. 4, illustrates the exemplary software code 300 of FIG. 3 and includes one or more nodes corresponding to each line of code in the exemplary software code 300. The operation of the exemplary software code 300 of FIG. 3, to the extent relevant to the disclosed software visualization techniques, will be discussed further below in conjunction with FIG. 4.

Figure 4:
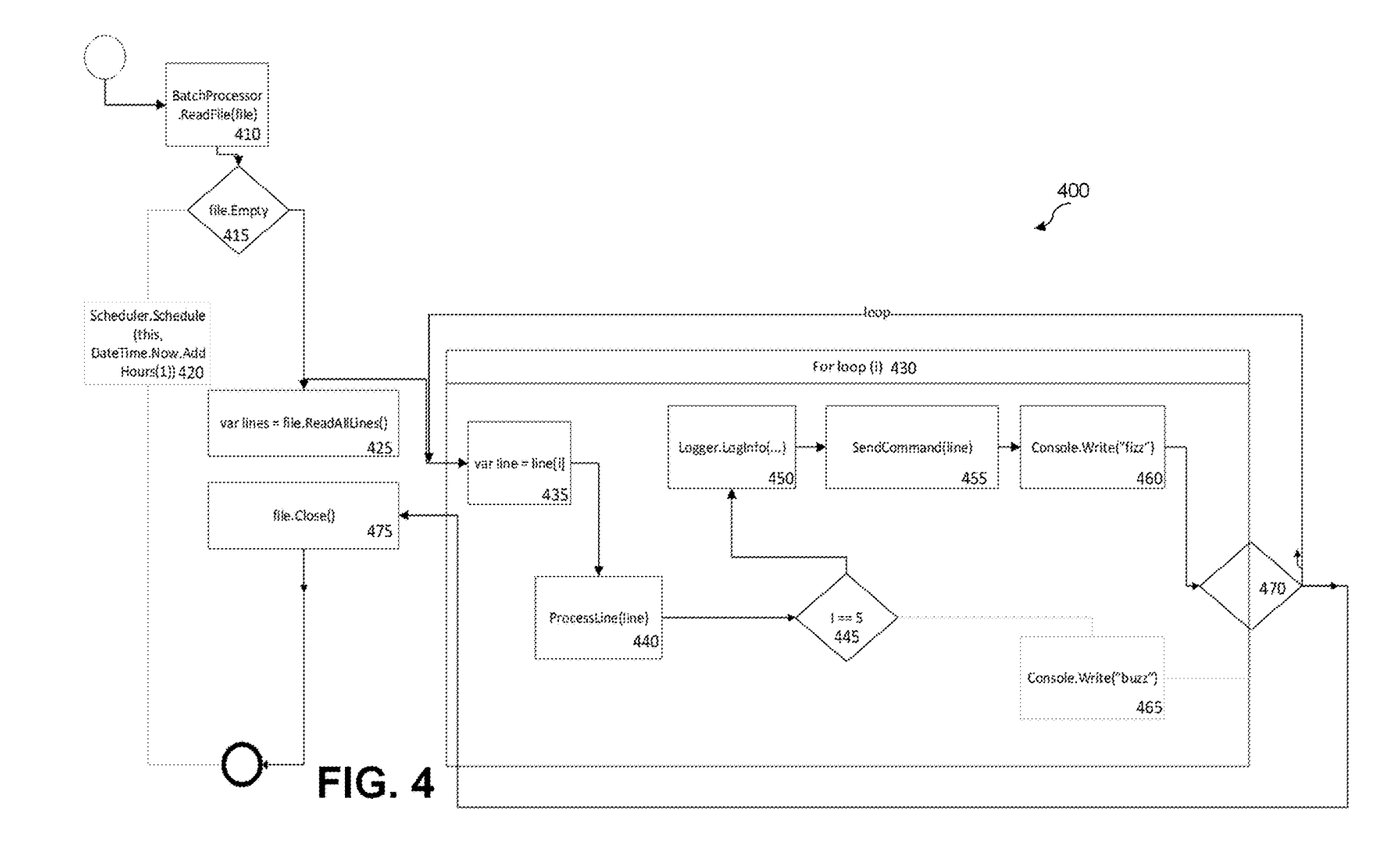
FIG. 4 illustrates a data flow diagram corresponding to the exemplary software code of FIG. 3, according to some embodiments.

FIG. 4 illustrates a data flow diagram 400 corresponding to the exemplary software code 300 of FIG. 3, according to some embodiments. As noted above, the data flow diagram 400 is generated during step 110 of the exemplary software visualization process 100 by processing the software code 300 to be visualized. Generally, in one or more embodiments, static code analysis is used during step 110 to analyze run-time behavior of the software code 300 and to create the data flow diagram 400 comprising a flow chart of substantially all possible executions of the software code 300. The nodes 410, 415, 420, 425, 435, 440, 445, 450, 455, 460, 465, 470, and 475 in the data flow diagram 400 of FIG. 4 represent corresponding functions in the software code 300.

As shown in FIG. 4, nodes 435, 440, 445, 450, 455, 460, 465 and 470 in the data flow diagram 400 of FIG. 4 are part of a "for loop" 430 in the software code 300. As noted above, the paths through the nodes shown in the data flow diagram 400 of FIG. 4 represent substantially all possible execution paths of the software code 300.

Figure 5:
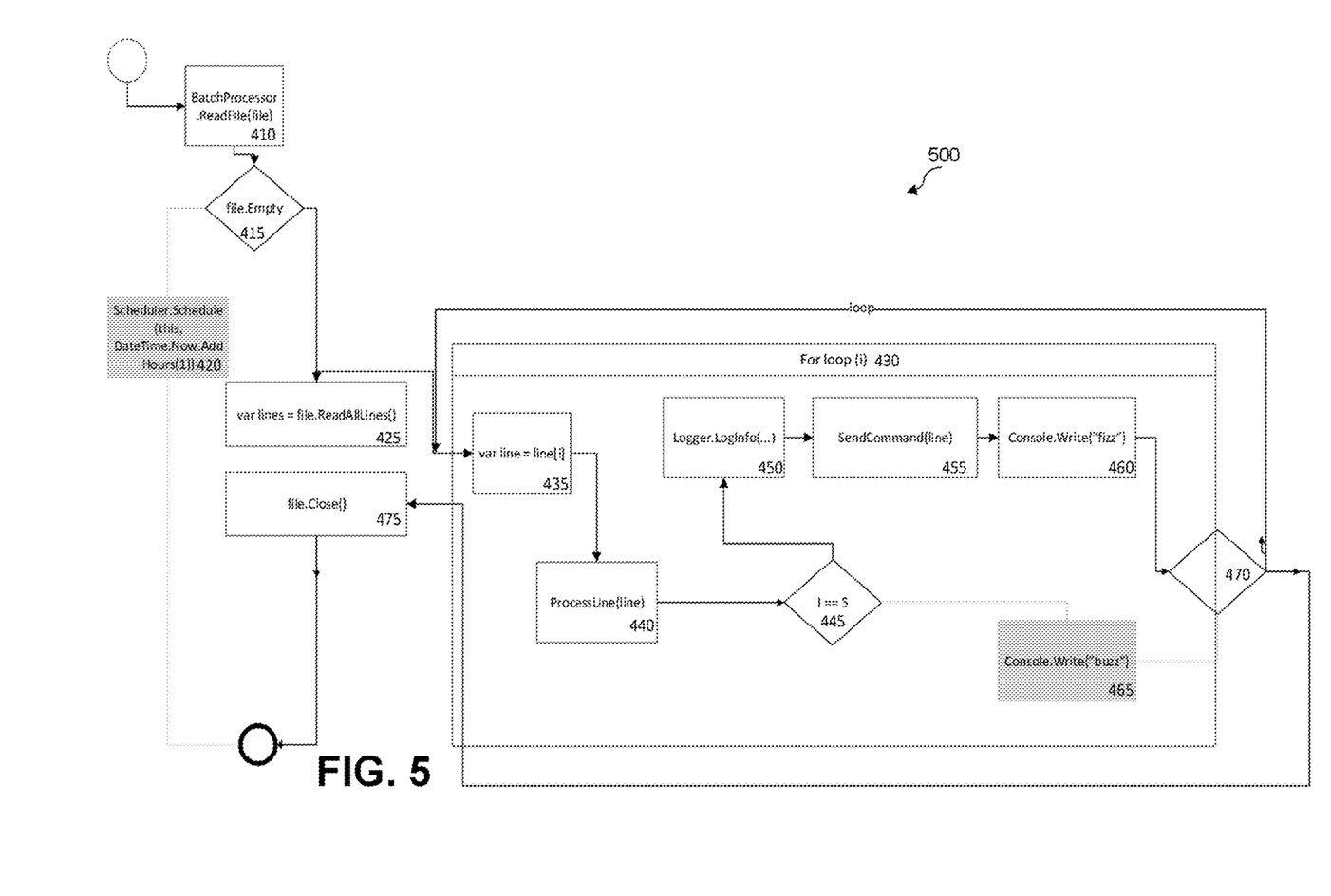
FIG. 5. illustrates an execution path diagram that marks a particular execution path through the data flow diagram of FIG. 4, according to one embodiment.

FIG. 5. illustrates the execution path diagram 500 that marks a particular execution path through the data flow diagram 400 of FIG. 4, according to one embodiment. As noted above, the execution path diagram 500 is generated by step 120 of the exemplary software visualization process 100 of FIG. 1. The data flow diagram 400 of FIG. 4 is processed together with one or more execution path parameters obtained, for example, from an execution profiler. In some embodiments, data obtained by monitoring application calls and/or a Call Stack is used to mark code execution paths through the data flow diagram 400 that were executed for a particular execution (associated with, for example, a particular use case and/or application scenario).

Generally, using the data flow diagram 400 of FIG. 4, previously created during step 110, the data obtained from the Call Stack is used in some embodiments to mark the path through the data flow diagram 400 that was executed for a particular execution (e.g., the code execution paths taken for a specific scenario).

The nodes 410, 415, 425, 435, 440, 445, 450, 455, 460, 465, 470, and 475 in the execution path diagram 500 operate in a similar manner as the corresponding nodes in the data flow diagram 400 of FIG. 4.

In the example of FIG. 5, nodes within paths that were executed at run-time are shown with a white filling, while nodes that were not executed at run-time are shown with a grey filling.

Figure 6:
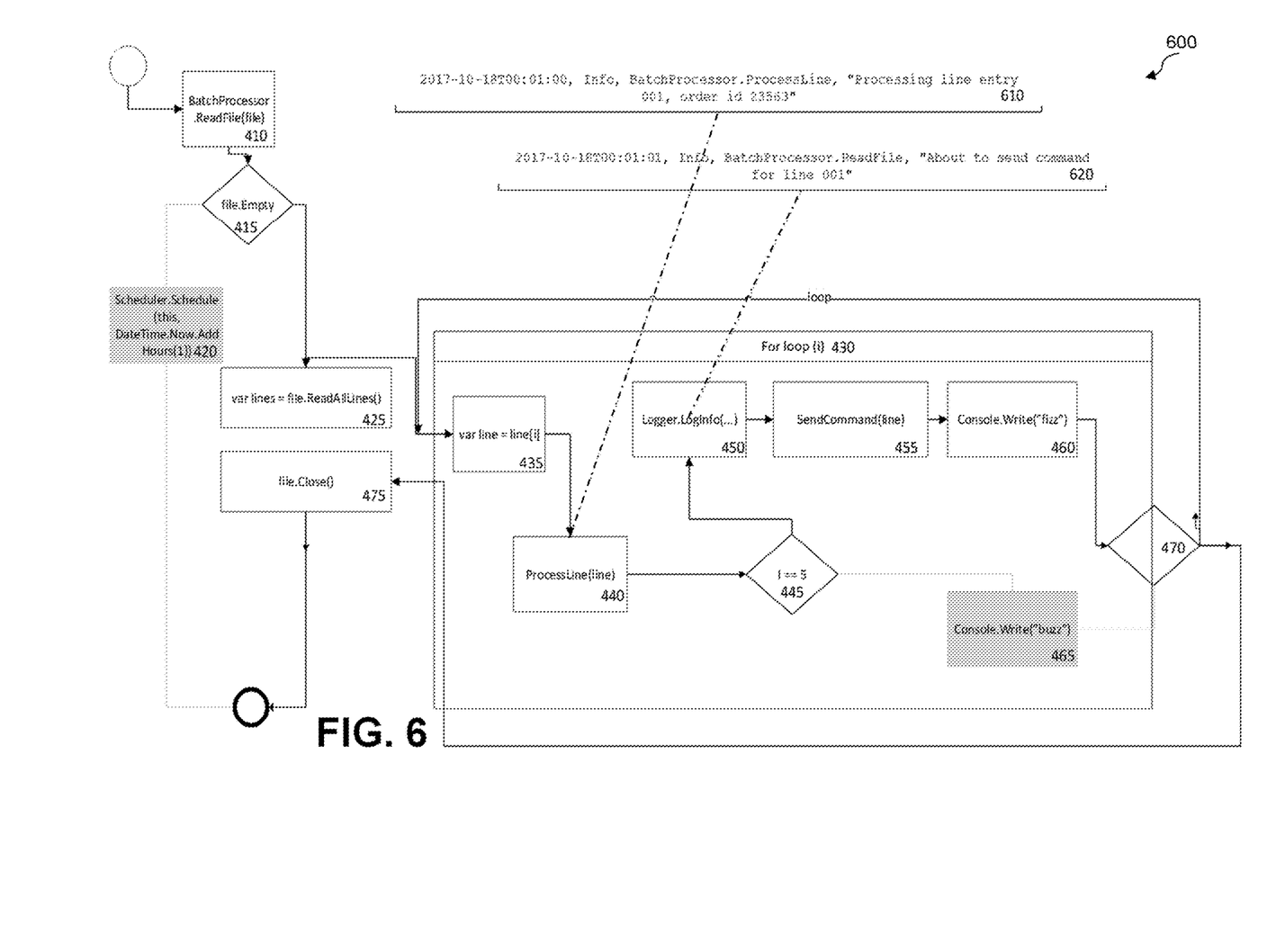
FIG. 6 illustrates an exemplary enriched execution path diagram that adds enrichment information to one or more nodes of the execution path diagram of FIG. 5, according to an embodiment.

FIG. 6 illustrates an exemplary enriched execution path diagram 600 that adds enrichment information to one or more nodes of the execution path diagram 500 of FIG. 5, according to an embodiment. It is generally known that log records are typically not intuitive enough to navigate without having the context of the execution.

As noted above, step 130 of the exemplary software visualization process 100 enriches the execution path diagram 500 with enrichment information, such as execution timestamps and contextual information. Generally, a plurality of log records 285 are processed to identify and extract log data corresponding to the execution of particular nodes in the execution path diagram 500. The extracted log data is used to enrich one or more nodes in the execution path diagram 500, representing the functions in the software code 300. The extracted log data may comprise, for example, application logs and execution timestamps. The enriched execution path diagram 600 provides additional contextual information, that can help to illustrate the code flow for a specific use case.

As noted above, the enrichment step 130 may comprise, for example, searching one or more application logs for timestamps, software module names, function names, and/or additional identifiers or contextual information, such as software thread identifiers, that correlate with the particular execution path for a specific execution scenario. In this manner, the extracted log data can be associated with the corresponding node(s) of the execution path diagram 500.

The nodes 410, 415, 425, 435, 440, 445, 450, 455, 460, 465, 470, and 475 in the exemplary enriched execution path diagram 600 operate in a similar manner as the corresponding nodes in the data flow diagram 400 of FIG. 4 and the execution path diagram 500 of FIG. 5.

In the example of FIG. 6, nodes 440 and 450 have been enriched with exemplary enrichment information 610, 620, respectively. The exemplary enrichment information 610, 620 is extracted from one or more application logs 285 and each enrichment information record 610, 620 comprises, for example, a timestamp, a log category (e.g., "info"), a software module name and/or a function name (e.g., "batchprocessor.processline" or "batchprocessor.read file") and contextual information, such as a software thread identifier. For example, as shown in FIG. 6, the representative contextual information in enrichment information record 610 comprises a tag indicating "processing line entry 001, order identifier 23563," and the representative contextual information in enrichment information record 620 comprises a tag indicating "about to send command for line 001".

One or more embodiments of the disclosure provide improved methods and apparatus for software visualization. The foregoing applications and associated embodiments should be considered as illustrative only, and numerous other embodiments can be configured using the techniques disclosed herein, in a wide variety of different applications.

In some embodiments, the disclosed software visualization techniques facilitate an understanding of the software code being visualized. Among other benefits, the visualization of the execution flow of the software code, according to the disclosed techniques, provides developers and other interested parties with an easier understanding of the entry points of the software code and how the code is orchestrated.

In one or more embodiments, the disclosed software visualization techniques are optionally repeated for multiple use cases, resulting in multiple enriched execution path diagrams that can be included in project technical documentation, and can help developers to pinpoint the exact code execution paths for specific scenarios. In this manner, the process of learning about the software code being visualized is improved. The data flows visualized using the disclosed techniques allow an expected data flow to be compared with an actual code execution.

The data flow diagrams 400, execution path diagrams 500 and/or enriched execution path diagrams 600, generated according to embodiments of the disclosure, can become a portion of the documentation of the underlying software code 300 and can be used to maintain the documentation (especially when different use cases have very different code execution paths, increasing the number of different diagrams to maintain, or increasing their complexity). In addition, one or more of the data flow diagrams 400, execution path diagrams 500 and/or enriched execution path diagrams 600 can be combined with test executions for typical use cases, to understand outlier executions and identify potential execution flow problems.

It should also be understood that the disclosed software visualization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed software visualization techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components of a software visualization system are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a software visualization platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
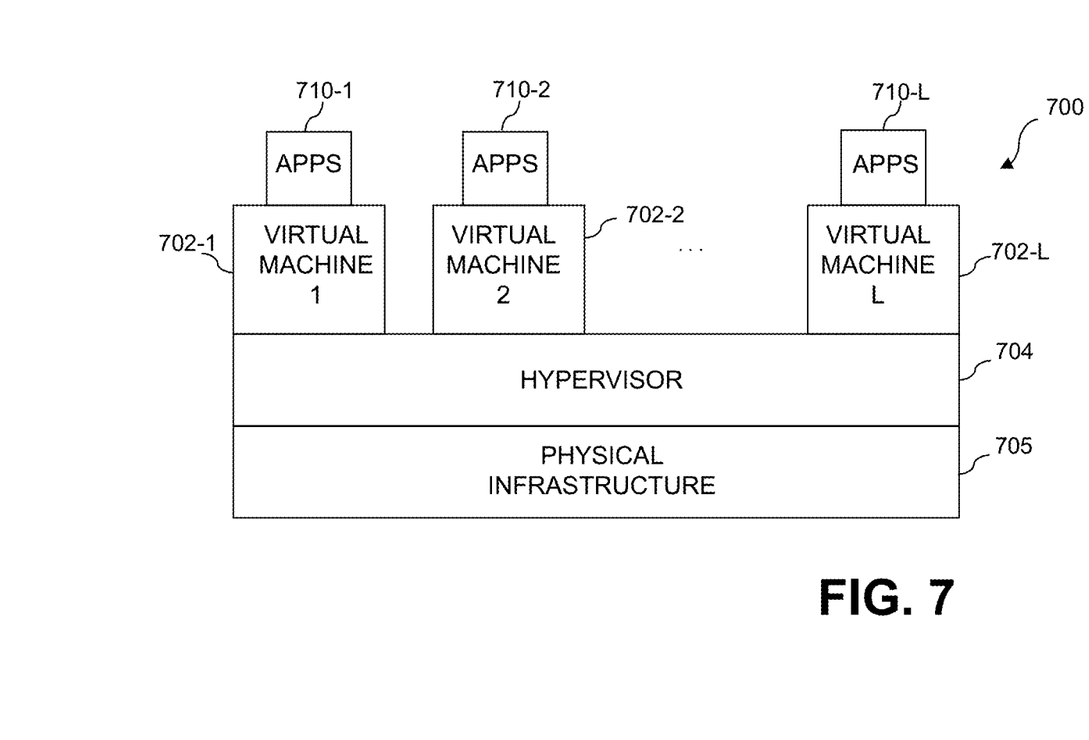
FIG. 7 illustrates an exemplary processing platform that may be used to implement at least a portion of one or more embodiments of the disclosure comprising a cloud infrastructure.

Referring now to FIG. 7, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the software visualization system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed software visualization apparatus may each run on a computer, server, storage device or other processing platform element. A given such element may be viewed as an example of what is more generally referred to herein as a "processing device." The cloud infrastructure 700 shown in FIG. 7 may represent at least a portion of one processing platform.

Figure 8:
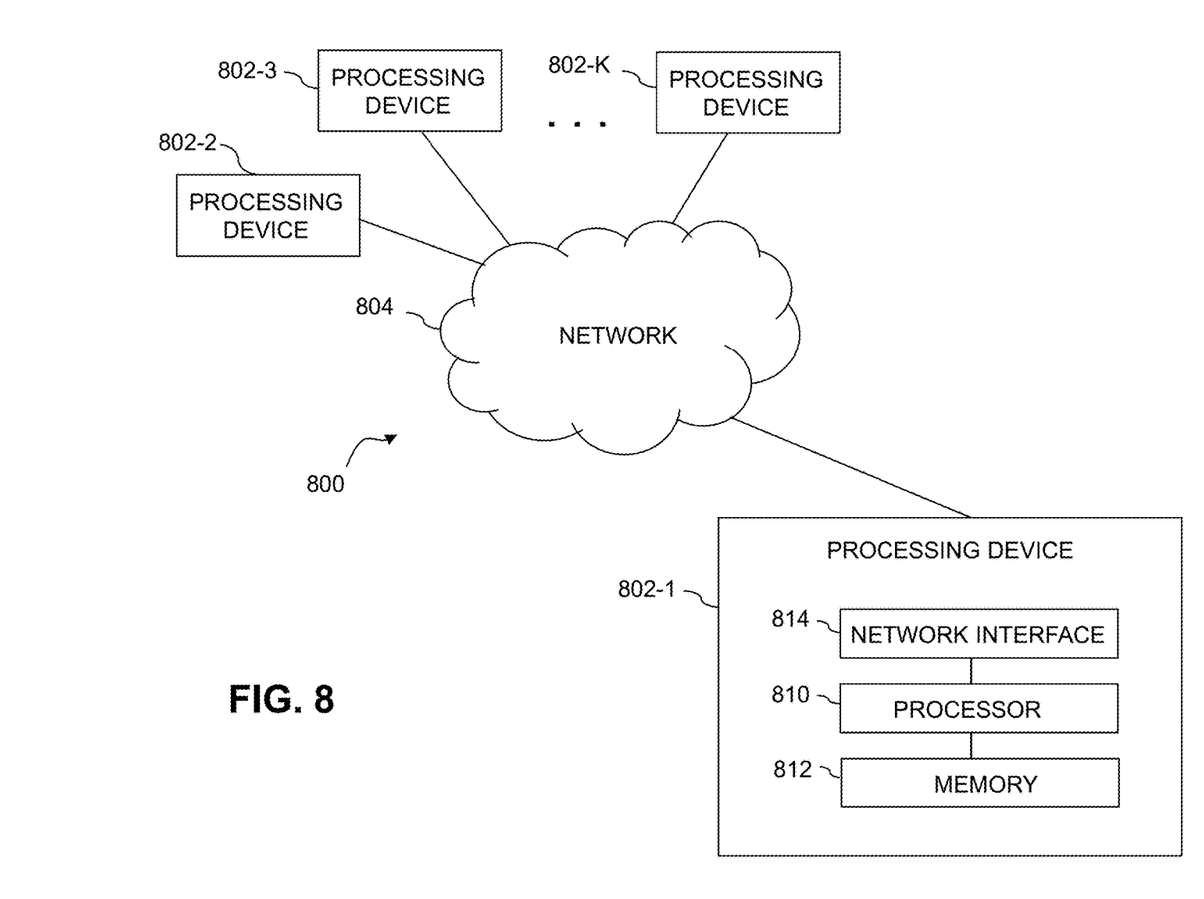
FIG. 8 illustrates another exemplary processing platform that may be used to implement at least a portion of one or more embodiments of the disclosure.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 1 and 2 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    performing a static code analysis to generate a data flow diagram illustrating a plurality of possible code execution paths of software code;
    marking, using an execution profiler, a particular execution path through the data flow diagram for a specific execution scenario,
    wherein said marking step obtains said particular execution path by monitoring one or more of application calls and a call stack; and
    enriching, using at least one processing device, one or more nodes in said data flow diagram marked with said particular execution path for said specific execution scenario with information extracted from one or more application logs,
    wherein said enriching comprises processing the one or more applications logs to identify and extract at least a particular portion of said one or more application logs and
    tagging a corresponding portion of said data flow diagram marked with said particular execution path for said specific execution scenario with said extracted particular portion of said one or more application logs.

2. The method of claim 1, wherein said specific execution scenario corresponds to one or more of a particular use case and a particular application.

3. The method of claim 1, wherein said enriching step further comprises the steps of searching said one or more application logs for one or more of timestamps, software module names, function names and additional identifiers that correlate with said particular execution path for said specific execution scenario.

4. The method of claim 1, wherein said information extracted from said one or more application logs comprises one or more of a timestamp, a log category, a software module name and a function name.

5. The method of claim 1, wherein said marking step obtains said particular execution path by monitoring one or more of application calls and a call stack.

6. The method of claim 1, wherein said marking step further comprises the step of visually highlighting a plurality of nodes of said data flow diagram included in said particular execution path.

7. The method of claim 1, wherein said information extracted from said one or more application logs comprises contextual information.

8. The method of claim 1, wherein said enriching step is repeated multiple times for different use cases to provide multiple enriched execution path diagrams for technical documentation.

9. The method of claim 1, wherein said enriching step is repeated multiple times for different use cases to provide multiple enriched execution path diagrams for technical documentation.

10. The method of claim 1, wherein said enriching step is repeated multiple times for different use cases to provide multiple enriched execution path diagrams for technical documentation.

11. A computer program product, comprising a tangible machine-readable storage medium having encoded therein executable code of one or more software programs, wherein the one or more software programs when executed by at least one processing device perform the following steps:
    performing a static code analysis to generate a data flow diagram illustrating a plurality of possible code execution paths of software code;
    marking, using an execution profiler, a particular execution path through the data flow diagram for a specific execution scenario,
    wherein said marking step obtains said particular execution path by monitoring one or more of application calls and a call stack; and
    enriching, using at least one processing device, one or more nodes in said data flow diagram marked with said particular execution path for said specific execution scenario with information extracted from one or more application logs,
    wherein said enriching comprises processing the one or more applications logs to identify and extract at least a particular portion of said one or more application logs and
    tagging a corresponding portion of said data flow diagram marked with said particular execution path for said specific execution scenario with said extracted particular portion of said one or more application logs.

12. The computer program product of claim 11, wherein said enriching step further comprises the steps of searching said one or more application logs for one or more of timestamps, software module names, function names and additional identifiers that correlate with said particular execution path for said specific execution scenario.

13. The computer program product of claim 11, wherein said information extracted from said one or more application logs comprises one or more of a timestamp, a log category, a software module name, a function name and contextual information.

14. The computer program product of claim 11, wherein said marking step obtains said particular execution path by monitoring one or more of application calls and a call stack.

15. The computer program product of claim 11, wherein said marking step further comprises the step of visually highlighting a plurality of nodes of said data flow diagram included in said particular execution path.

16. The computer program product of claim 11, wherein said specific execution scenario corresponds to one or more of a particular use case and a particular application.

17. An apparatus, comprising:
a memory; and
at least one processing device, coupled to the memory, operative to implement the following steps:
performing a static code analysis to generate a data flow diagram illustrating a plurality of possible code execution paths of software code;
marking, using an execution profiler, a particular execution path through the data flow diagram for a specific execution scenario,
wherein said marking step obtains said particular execution path by monitoring one or more of application calls and a call stack; and
enriching, using said at least one processing device, one or more nodes in said data flow diagram marked with said particular execution path for said specific execution scenario with information extracted from one or more application logs,
wherein said enriching comprises processing the one or more applications logs to identify and retrieve at least a particular portion of said one or more application logs and tagging a corresponding portion of said data flow diagram marked with said particular execution path for said specific execution scenario with said extracted particular portion of said one or more application log.

18. The apparatus of claim 17, wherein said specific execution scenario corresponds to one or more of a particular use case and a particular application.

19. The apparatus of claim 17, wherein said enriching step further comprises the steps of searching said one or more application logs for one or more of timestamps, software module names, function names and additional identifiers that correlate with said particular execution path for said specific execution scenario.

20. The apparatus of claim 17, wherein said information extracted from said one or more application logs comprises one or more of a timestamp, a log category, a software module name and a function name.

21. The apparatus of claim 17, wherein said marking step obtains said particular execution path by monitoring one or more of application calls and a call stack.

22. The apparatus of claim 17, wherein said marking step further comprises the step of visually highlighting a plurality of nodes of said data flow diagram included in said particular execution path.

23. The apparatus of claim 17, wherein said information extracted from said one or more application logs comprises contextual information.

\* \* \* \* \*